(12) United States Patent
Zeinstra et al.

(10) Patent No.: US 7,787,907 B2
(45) Date of Patent: Aug. 31, 2010

(54) SYSTEM AND METHOD FOR USING SPEECH RECOGNITION WITH A VEHICLE CONTROL SYSTEM

(75) Inventors: Mark Zeinstra, Holland, MI (US);
Brian L. Douthitt, Holland, MI (US);
Michael J. Sims, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 11/517,946

(22) Filed: Sep. 8, 2006

(65) Prior Publication Data

US 2007/0061067 A1 Mar. 15, 2007

Related U.S. Application Data

(63) Continuation-in-part of application No. 10/127,982, filed on Apr. 23, 2002, now Pat. No. 7,349,722, which is a continuation of application No. 09/979,199, filed as application No. PCT/US00/14692 on May 26, 2000, now Pat. No. 7,257,426, application No. 11/517,946, which is a continuation-in-part of application No. 10/336,466, filed on Jan. 3, 2002, now Pat. No. 7,346,374, which is a continuation-in-part of application No. 09/979,199, filed as application No. PCT/US00/14692 on May 26, 2000, now Pat. No. 7,257,426.

(60) Provisional application No. 60/135,979, filed on May 26, 1999.

(51) Int. Cl.
*H04M 1/00* (2006.01)
*H04B 1/38* (2006.01)

(52) U.S. Cl. ............. 455/563; 455/41.1; 455/569.2

(58) Field of Classification Search ............ 455/563, 455/418, 419, 566, 414.1, 414.3, 564, 414.2, 455/41.1, 569.1, 569.2, 344, 345
See application file for complete search history.

(56) References Cited

U.S. PATENT DOCUMENTS 4,827,520 A 5/1989 Zeinstra (Continued)

FOREIGN PATENT DOCUMENTS

DE 196 29 408 A1 1/1998

(Continued)

OTHER PUBLICATIONS

Gilroy, Amy, "Sony Joins in Music Streaming From Cellphones to Car Audio," printed from website www.twice.com on Aug. 17, 2006, 2 pages.

(Continued)

*Primary Examiner*—Quochien B Vuong
(74) *Attorney, Agent, or Firm*—Foley & Lardner LLP (57) ABSTRACT

A method for accessing data files with an in-vehicle control system from a remote source over a communication link. The communication link is established between an in-vehicle control system and the remote source. The method includes: establishing the communication link between the in-vehicle control system and the remote source to facilitate retrieving the data files from the remote source to the in-vehicle control system; retrieving at least one of the data files from the remote source over the communication link, wherein each of the data files may include text and numeric data; identifying the text and numeric data of each of the data files; generating a phonemic representation of the text and numeric data of the data files; and storing the data file retrieved from a remote source in a memory device.

16 Claims, 8 Drawing Sheets

U.S. PATENT DOCUMENTS

| | | |
|---|---|---|
| 4,905,270 A | 2/1990 | Ono |
| 5,584,052 A | 12/1996 | Gulau et al. |
| 5,810,420 A | 9/1998 | Welling |
| 5,832,390 A | 11/1998 | Irvin |
| 5,898,392 A | 4/1999 | Bambini et al. |
| 6,038,441 A | 3/2000 | Slaven et al. |
| 6,052,603 A | 4/2000 | Kinzalow et al. |
| 6,128,482 A * | 10/2000 | Nixon et al. ............. 455/414.1 |
| 6,154,663 A | 11/2000 | Itamochi |
| 6,173,195 B1 | 1/2001 | Chen |
| 6,198,947 B1 | 3/2001 | Barber |
| 6,202,008 B1 | 3/2001 | Beckert et al. |
| 6,285,757 B1 | 9/2001 | Carroll et al. |
| 6,304,764 B1 | 10/2001 | Pan |
| 6,349,222 B1 | 2/2002 | Hafiz |
| 6,377,825 B1 | 4/2002 | Kennedy et al. |
| 6,532,374 B1 | 3/2003 | Chennakeshu et al. |
| 6,542,758 B1 | 4/2003 | Chennakeshu et al. |
| 6,600,430 B2 | 7/2003 | Minagawa et al. |
| 7,047,039 B2 | 5/2006 | Lalley |
| 7,257,426 B1 | 8/2007 | Witkowski et al. |
| 7,346,374 B2 | 3/2008 | Witkowski et al. |
| 7,349,722 B2 | 3/2008 | Witkowski et al. |
| 2001/0045774 A1 | 11/2001 | Rode |
| 2002/0025832 A1 | 2/2002 | Durian et al. |
| 2002/0049535 A1 | 4/2002 | Rigo et al. |
| 2002/0120925 A1 | 8/2002 | Logan |
| 2002/0197955 A1 | 12/2002 | Witkowski et al. |
| 2003/0228879 A1 | 12/2003 | Witkowski et al. |
| 2004/0033821 A1 | 2/2004 | Slesak et al. |
| 2004/0048622 A1 | 3/2004 | Witkowski et al. |
| 2004/0089141 A1 | 5/2004 | Georges et al. |
| 2004/0110472 A1 | 6/2004 | Witkowski et al. |
| 2004/0117442 A1 | 6/2004 | Thielen |
| 2004/0203379 A1 | 10/2004 | Witkowski et al. |
| 2005/0090279 A9 | 4/2005 | Witkowski et al. |
| 2005/0155068 A1 | 7/2005 | Chang |
| 2005/0223406 A1 | 10/2005 | Vitito |
| 2005/0235326 A1 | 10/2005 | Vitito |
| 2005/0235327 A1 | 10/2005 | Vitito |
| 2005/0239434 A1 | 10/2005 | Marlowe |
| 2005/0281414 A1 | 12/2005 | Simon et al. |
| 2006/0034481 A1 | 2/2006 | Barzegar et al. |
| 2006/0070102 A1 | 3/2006 | Vitito |
| 2006/0168627 A1 | 7/2006 | Zeinstra et al. |
| 2007/0061067 A1 | 3/2007 | Zeinstra et al. |
| 2007/0082706 A1 | 4/2007 | Campbell et al. |
| 2007/0233725 A1 | 10/2007 | Michmerhuizen et al. |
| 2008/0045274 A1 | 2/2008 | Witkowski et al. |

FOREIGN PATENT DOCUMENTS

| | | |
|---|---|---|
| DE | 199 17 169 | 11/2000 |
| EP | 0 746 129 | 12/1996 |
| WO | WO 99/03254 | 1/1999 |
| WO | WO 99/05839 | 2/1999 |

OTHER PUBLICATIONS

Jain, Ankit et al., "Standard boosts automotive Bluetooth streaming," Automotive Design Line, printed from website www.automotivedesignline.com on Jun. 15, 2006, 6 pages.

Johnston, Lisa, "ANYCOM Announces Bluetooth Adapter for iPod nano," TWICE: This Week in Consumer Electronics, printed from website www.twice.com on Aug. 17, 2006, 1 page.

Pioneer DEH-P9800BT, CD receiver with MP3/WMA playback and Bluetooth wireless, Crutchfield, printed from website www.crutchfield.com on Nov. 27, 2006, 3 pages.

Sony MEX-BT5000, CD receiver with Bluetooth technology and MP3/WMA playback, Crutchfield, printed from website www.crutchfield.com on Nov. 27, 2006, 2 pages.

Comprehensive Description of the Bluetooth System, Jun. 17, 1988, 72 pages.

\* cited by examiner

SYSTEM AND METHOD FOR USING SPEECH RECOGNITION WITH A VEHICLE CONTROL SYSTEM

CROSS-REFERENCE TO RELATED PATENT APPLICATIONS

This application is a continuation-in-part of U.S. patent application Ser. No. 10/127,982 (now U.S. Pat. No. 7,349,722) filed on Apr. 23, 2002, which is a continuation of U.S. patent application Ser. No. 09/979,199 filed on Apr. 29, 2002 (now U.S. Pat. No. 7,257,426), which is a 35 U.S.C. 371 National Phase Application of PCT/US2000/014692 filed on May 26, 2000, which claims priority to U.S. provisional patent application No. 60/135,979 filed May 26, 1999, each of which is hereby incorporated by reference in its entirety. This application is also a continuation-in-part of U.S. patent application Ser. No. 10/336,466 (now U.S. Pat. No. 7,346,374) filed on Jan. 3, 2003, also hereby incorporated by reference in its entirety, which is a continuation-in-part of U.S. patent application Ser. No. 09/979,199 filed on Apr. 29, 2002 (now U.S. Pat. No. 7,257,426), which is a 35 U.S.C. 371 National Phase Application of PCT/US2000/014692 filed on May 26, 2000, which claims priority to U.S. provisional patent application No. 60/135,979 filed May 26, 1999.

FIELD OF THE INVENTION

The present invention relates generally to the fields of data communication and speech recognition in a motor vehicle and particularly to speech recognition with a motor vehicle control system that recognizes audible speech to access data from a remote source of data and control other motor vehicle systems.

BACKGROUND OF THE INVENTION

Vehicles may include a number of subsystems including an HVAC system, a audio system, and an engine management system that may be controlled by a user interface, such as a vehicle center console. Many vehicles also include capabilities to interface with external devices such as media players, mobile phones, or other handheld/mobile devices. Some vehicles are configured to communicate with mobile devices using a wireless connection, such as a Bluetooth communications protocol, an IEEE 802.11x communications protocol, an IEEE 802.16 communications protocol, or other wireless communication technology. Some vehicles may even have speech recognition capabilities, as such capabilities relate to vehicle navigation on a vehicle console or an external navigation device. However, it is noted that it would be advantageous to have a central vehicle control system that facilitates speech recognition in order to access and/or control remote sources, such as mobile phones, media players, personal digital assistants, etc., over a communication link, wherein the communication link may be wired or wireless.

SUMMARY OF THE INVENTION

One embodiment of the invention relates to an in-vehicle control system for accessing data files from a remote source over a communication link. The system includes a communication device for establishing the communication link with the remote source. The communication device is configured to receive a plurality of data files from the remote source, wherein each of the data files includes at least one of text data and numeric data. The system also includes a speech recognition device configured to receive an oral input command from a user. The speech recognition device is configured to compare the received oral input command to a set of predetermined input commands, wherein the speech recognition device determines an appropriate response based on the oral input command received from the user. The system also includes a data processing device coupled to the communication device. The data processing device is configured to generate a phonemic representation of the text data and numeric data of the data files, wherein the phonemic representation of the text and numeric data of each data file is configured to facilitate speech recognition of each data file. The system also includes a display driver coupled to an output display. The display driver is configured to provide an electronic signal to the output display, wherein the electronic signal comprises the text data and numeric data.

Another embodiment of the invention relates to a method for accessing data files from a remote source over a communication link. The communication link is established between an in-vehicle control system and the remote source. The method includes the step of establishing the communication link between the in-vehicle control system and the remote source to facilitate retrieving the data files from the remote source to the in-vehicle control system. The method also includes the step of retrieving at least one of the data files from the remote source over the communication link, each of the data files including text and numeric data. The method also includes the step of identifying the text and numeric data of each of the data files. The method also includes the step of generating a phonemic representation of the text and numeric data of the data files. The method also includes the step of storing the data file retrieved from a remote source in a memory device.

DETAILED DESCRIPTION OF THE EXEMPLARY EMBODIMENTS

Figure 1:
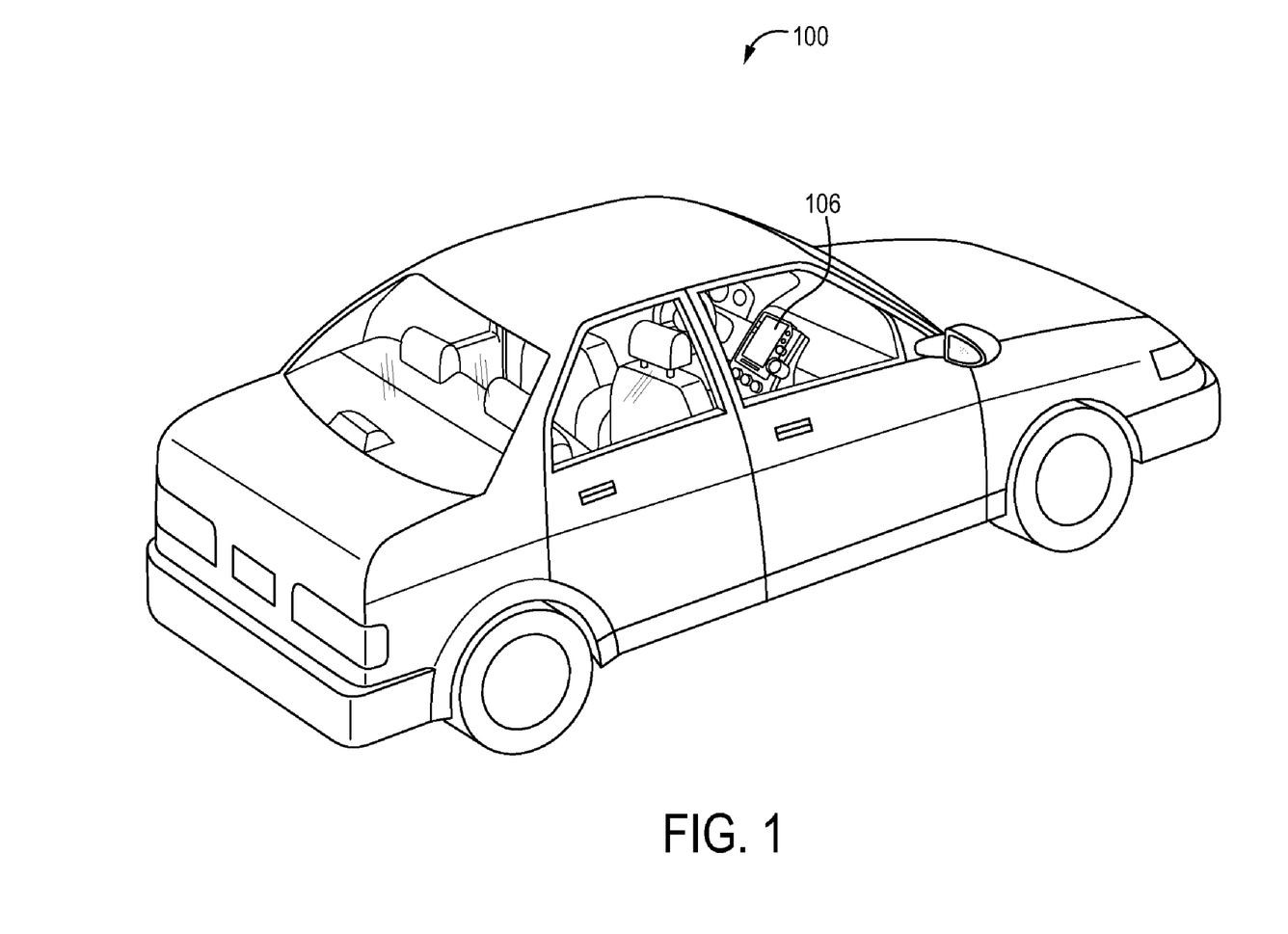
FIG. 1 is a perspective view of a motor vehicle that includes a number of vehicle systems, including an in-vehicle control system according to one exemplary embodiment.

Referring to FIG. 1, a vehicle 100 includes a number of subsystems for user convenience. Vehicle 100 generally includes a heating, ventilation, and air-conditioning (HVAC) system, a sound system, and an in-vehicle control system 106. The HVAC system and sound system may be coupled to in-vehicle control system 106, which is capable of controlling and monitoring both systems, automatically or by a manual user command. It is noted that in various exemplary embodiments: vehicle 100, the HVAC system, and the sound system may be of any past, present, or future design that is capable of housing (in the case of vehicle 100) and interacting with in-vehicle control system 106.

Figure 2:
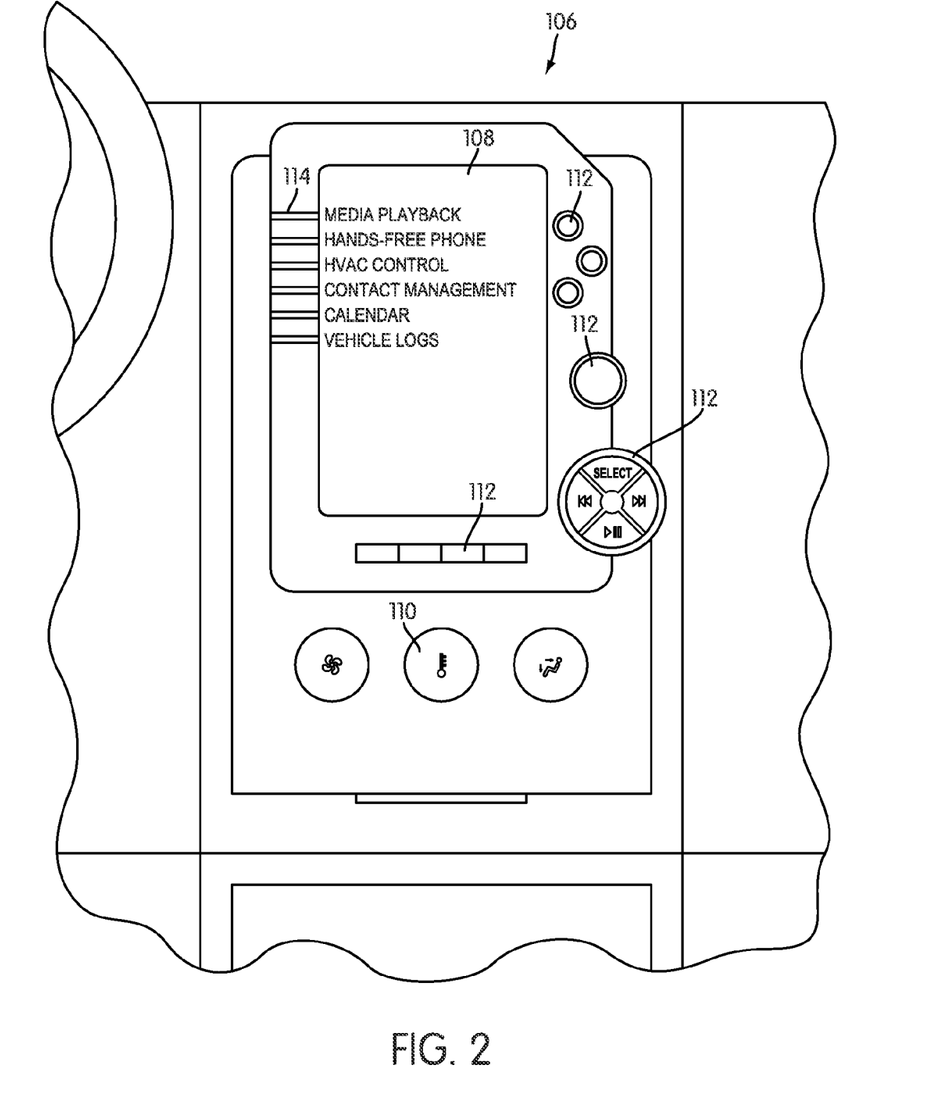
FIG. 2 is a front elevation view of the user interface of the in-vehicle control system of FIG. 1 according to one exemplary embodiment.

Referring to FIG. 2, one exemplary embodiment of in-vehicle control system 106 is shown. In-vehicle control system 106 generally includes an output display 108, one or more knobs 110, one or more pushbuttons 112, and one or more tactile user inputs or pushbuttons 114, which facilitate controlling various vehicle functions. Output display 108 may be configured to display data related to the control of the vehicle functions. In one exemplary embodiment, output display 108 may be a touch-screen display, while in other exemplary embodiments, may be any other non-touch sensitive display. In still other exemplary embodiments, output display 108 may be of any technology (e.g. LCD, DLP, plasma, CRT), configuration (e.g. portrait or landscape), or shape (e.g. polygonal, curved, curvilinear). Knobs 110 and pushbuttons 112 and 114 may be configured: (i) to control functions of the HVAC system such as fan speed, cabin temperature, or routing of air flow, (ii) to control playback of media files over the sound system, (iii) to control retrieval of phonebook entries, or (iv) to control any other desired vehicle function. Pushbuttons 114 typically allow for the selection and display of various functions of in-vehicle control system 106 including HVAC system control, sound system control, hands-free phone use, contact or address/phone book management, calendar viewing/modification, and vehicle data logging. The operation of pushbutton 114 for media playback may display a media playback menu screen or execute commands that allow the user to view, select, sort, search for, and/or play audio or video files by tactile or oral command. The operation of pushbutton 114 for hands-free phone operation may display a menu screen or execute commands that allows the user to connect in-vehicle control system 106 to a mobile phone so that speaking into the vehicle console of in-vehicle control system 106 operates the mobile phone. The operation of pushbutton 114 for HVAC control may display a menu screen or execute commands that allow the user to control cabin temperature and air flow by tactile or oral command. The operation of pushbutton 114 for contact management may display a menu screen or execute commands that allow the user to view, list, select, sort, search for, edit and/or dial one or more entries containing personal contact information, by use of a tactile or oral command. The operation of pushbutton 114 for calendar management may display a menu screen or execute commands that allow the user to view, list, select, sort, search for, edit and/or create one or more entries containing personal schedule information by tactile or oral command. The operation of pushbutton 114 for vehicle log management may display a menu screen or execute commands that allow the user to input, view, select and/or reset information related to vehicle operation (e.g. fuel economy, engine temperature, distance to empty, etc.) by tactile or oral command.

Figure 3:
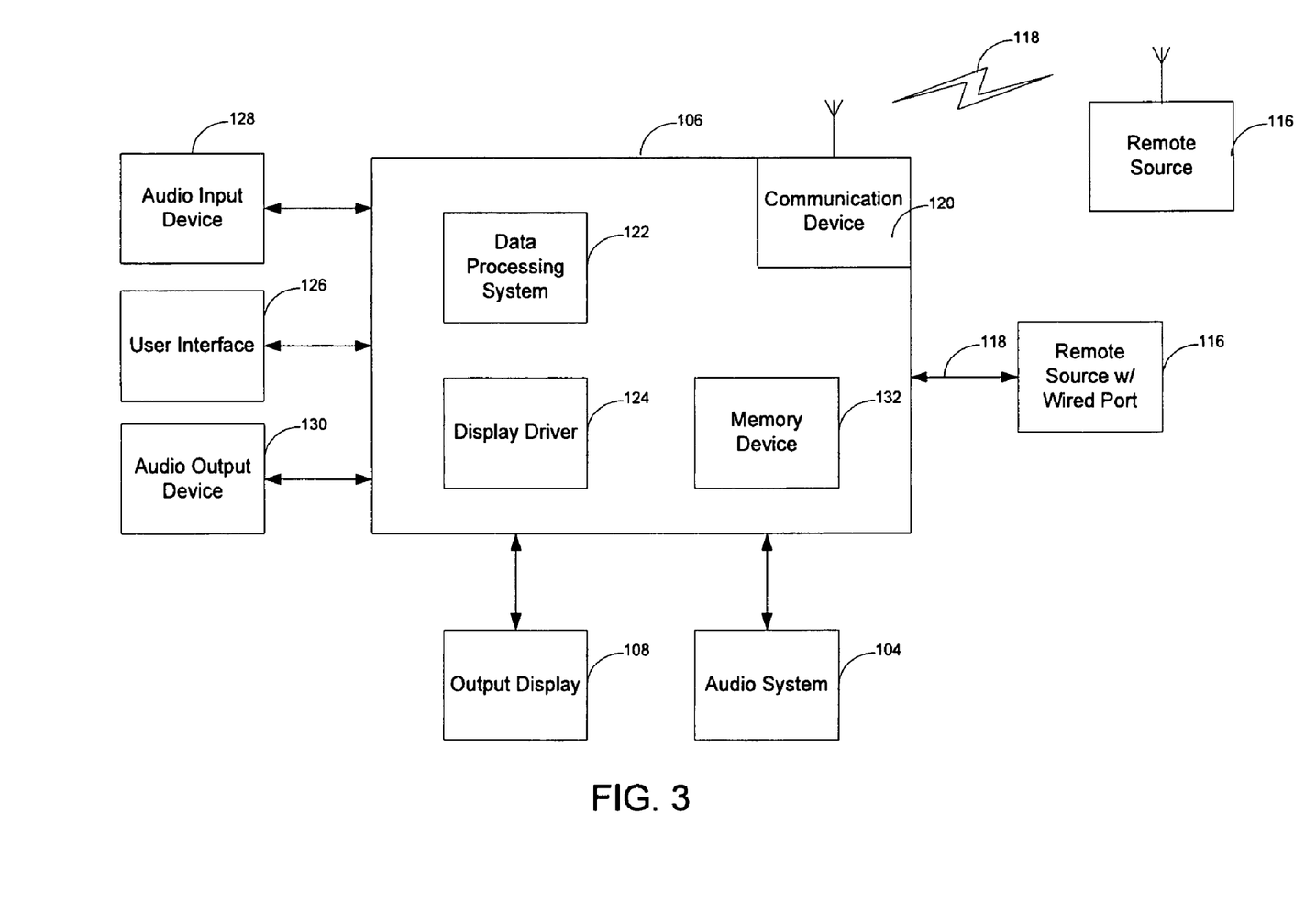
FIG. 3 is a block diagram of the in-vehicle control system of FIG. 1 that includes a speech recognition system according to one exemplary embodiment.

Referring to FIG. 3, in-vehicle control system 106 is capable of accessing data files from a remote source 116 over a communication link 118. For example, in-vehicle control system 106 may access media data files, phonebook data files, calendar data, or any other accessible data of use by in-vehicle control system.

In-vehicle control system 106 generally includes a communication device 120, a data processing system 122, a display driver 124, a user interface 126, an audio input device 128, an audio output device 130, and a memory device 132.

Communication device 120 is generally configured to establish communication link 118 with remote source 116. In one exemplary embodiment, in-vehicle control system 100 may establish a wireless communication link such as with Bluetooth communications protocol, an IEEE 802.11 protocol, an IEEE 802.16 protocol, a cellular signal, a Shared Wireless Access Protocol-Cord Access (SWAP-CA) protocol, or any other suitable wireless technology. In another exemplary embodiment, in-vehicle control system 100 may establish a wired communication link such as with USB technology, Firewire technology, optical technology, other serial or parallel port technology, or any other suitable wired link. Communication device 120 may receive one or more data files from remote source 116. In various exemplary embodiments, the data files may include text, numeric data, or any combination thereof.

Data processing system 122 is coupled to communications device 120 and is generally configured to control each function of in-vehicle control system 106. Data processing system 122 preferably facilitates speech recognition capabilities of in-vehicle control system 106 for the convenience of the user. Data processing system 122 may include digital or analog processing components or be of any past, present, or future design that facilitates control of in-vehicle control system 106.

Display driver 124 is coupled to output display 108 and is typically configured to provide an electronic signal to the output display. In one exemplary embodiment, the electronic signal may include the text and/or numeric data of the data files, while in other exemplary embodiments, any other desired data may be included with the text and/or numeric data or by itself in the electronic signal to the output display. In another exemplary embodiment, display driver 124 may be configured to control output display 108 with touch-screen capabilities, while in other exemplary embodiments, display driver 124 may be configured to control display 108 without making use of touch-screen capabilities. In still other exemplary embodiments, display driver 124 may be of any past, present, or future design that allow for the control of output display 108.

User interface 126 is typically configured to facilitate tactile user interaction with in-vehicle control system 106. In various exemplary embodiments, user interface 126 may include pushbuttons or rotatable knobs as in the exemplary embodiment of FIG. 2 in any similar or dissimilar configuration or may include other tactile user contact points.

Audio input device 128, for example a microphone, is configured to receive the utterance of a user for transmission to data processing system 122 for speech recognition so that the functions of in-vehicle control system 106 may be operated by voice command. Audio output device 130, for example a built-in speaker, is configured to provide the user with an audio prompt of various functions, such as user selection confirmation.

Memory device 132 is configured to store data accessed by in-vehicle control system 106. For example, memory device 132 may store data input by remote source 116, data created by data processing system 122 that may be used later, intermediate data of use in a current calculation, or any other data of use by in-vehicle control system 106.

Figure 4:
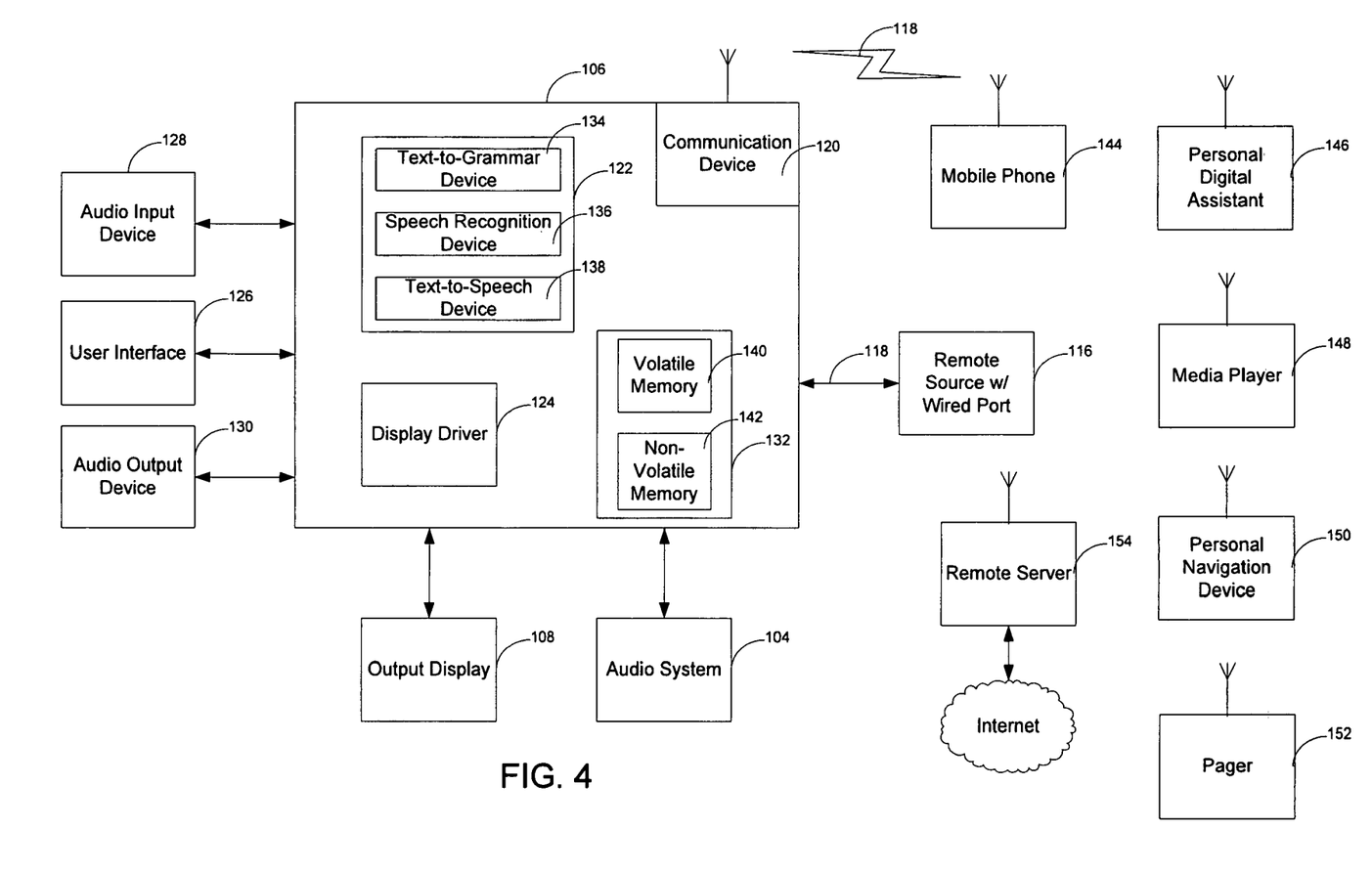
FIG. 4 is a more detailed embodiment of the in-vehicle control system of FIG. 3 according to one exemplary embodiment.

Referring to FIG. 4, in-vehicle control system 106 and remote source 116 are illustrated in greater detail. Data processing system 122 generally includes a text-to-grammar device 134, a speech recognition device 136, and a text-to-speech device 138.

Text-to-grammar device 134 is preferably coupled to communications device 120 and is generally configured to generate a phonemic representation of the text and/or numeric data of each of the data files received by communications device 120 from remote source 116. The phonemic representation of the text and/or numeric data of each data file may be configured to facilitate speech recognition of each data file. After conversion of a data file to a phonemic representation, the data file may be accessed via an oral input command received by speech recognition device 136 via audio input device 128.

Speech recognition device 136 is typically configured to receive an oral input command from a user via audio input device 128. Speech recognition device compares the received oral input command to a set of predetermined input commands, which may have been configured by text-to-grammar device 134. In various exemplary embodiments, the input commands may be related to the playback of a media file, the dialing or input of a phone book entry, the entry or listing of calendar or contact data, the control of the HVAC system, or any other desired function to be performed on data. Speech recognition device 136 may determine an appropriate response to the oral input command received from the user, for example, whether the oral input command is a valid or invalid instruction, what command to execute, or any other appropriate response.

Text-to-speech device 138 is generally configured to convert the text and/or numeric data of each data file received from remote source 116 into an audible speech representation. This functionality may allow in-vehicle control system 106 to audibly give data to the user via audio output device 130 or the sound system. For example, in-vehicle control system may repeat a user selected function back to the user, announce media file information, provide phonebook or contact information, or other information related to data stored in memory 132 or remote source 116.

Memory device 132 includes both a volatile memory 140 and a non-volatile memory 142. Volatile memory 140 may be configured so that the contents stored therein may be erased during each power cycle. Non-Volatile memory 142 may be configured so that the contents stored therein may be retained across power cycles, such that upon system power-up, data from previous system use remains available for the user.

Note that remote source 116 may be any suitable remote source that includes a transceiver and is able to interface with in-vehicle control system 106 over communications link 118, in either a wireless or wired embodiment. In various exemplary embodiments, remote source 116 may be one or more of a mobile phone 144, a personal digital assistant (PDA) 146, a media player 148, a personal navigation device (PND) 150, a remote server 154 that is coupled to the internet, or various other remote data sources.

Figure 5:
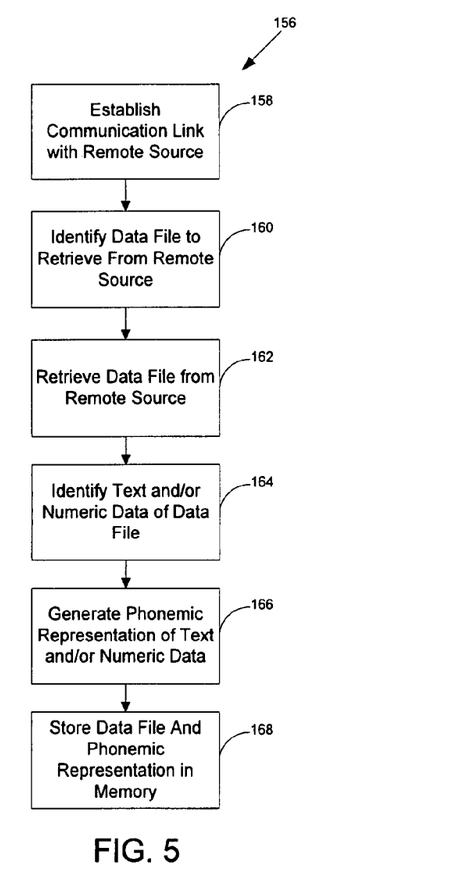
FIG. 5 is process flow diagram illustrating a method of generating a phonemic representation of data with the in-vehicle control system of FIG. 3 according to one exemplary embodiment.

Referring to FIG. 5, a general method 156 of generating a phonemic representation of data from certain data accessed from remote source 116 with in-vehicle control system 106 is shown.

At a step 158, in-vehicle control system 106 establishes communications link 118 (shown in FIGS. 3 and 4) with remote source 116. In various exemplary embodiments, in-vehicle control system 106 may establish a wireless or wired link.

At a step 160, in-vehicle control system 106 identifies a data file to retrieve from remote source 116. In one exemplary embodiment, in-vehicle control system 106 may identify a data file based on input from a user, including speech or manual user input. In other exemplary embodiments, in-vehicle control system 106 may identify a data file based on a signal from remote source 116 or based on an algorithm executed by in-vehicle control system 106.

At a step 162, in-vehicle control system 106 retrieves the identified data file of step 160 from remote source 116 over communications link 118.

At a step 164, in-vehicle control system 106 identifies textual and/or numeric data contained in the retrieved data file of step 162.

At a step 166, text-to-grammar device 134 of in-vehicle control system 106 generates a phonemic representation of the textual and/or numeric data identified in step 164. In various exemplary embodiments, the generation of a phonemic representation may be accomplished by any past, present, or future text-to-grammar methodology.

At a step 168, in-vehicle control system 106 stores the retrieved data file of step 162 and the phonemic representation created in step 166 in memory 132. In one exemplary embodiment, the phonemic representation may be stored with the data file in an adjacent memory cell. In other exemplary embodiments, the phonemic representation may be stored in an area of memory 132 separate from the data file provided that a link associating the memory items is created and maintained.

Figure 6:
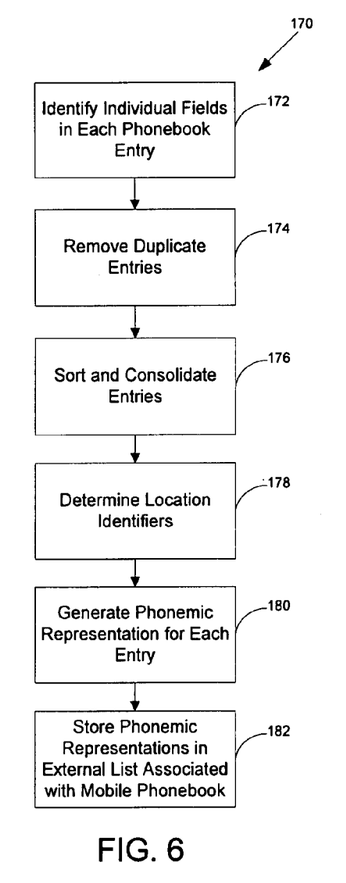
FIG. 6 is process flow diagram illustrating a method of retrieving and processing data associated with electronic phonebook entries with the in-vehicle control system of FIG. 3 according to one exemplary embodiment.

Referring to FIG. 6, a method 170 illustrates how in-vehicle control system 106 processes phonebook data from remote source 116 and creates a mobile phonebook, according to one exemplary embodiment. It is noted that in the exemplary embodiment of method 170, the electronic phonebook entries are retrieved from remote source 116, which may be a mobile phone 144, personal digital assistant 146, personal navigation device 150, pager 152, remote server 154, or any other device capable of storing electronic phonebook entries.

At a step 172, in-vehicle control system 106 accesses the file where the retrieved remote phonebook entries are stored and identifies the individual fields in each entry such as name (i.e., a text string), number, or the number's location identifier (e.g., home, work, mobile, pager).

At a step 174, in-vehicle control system 106 processes the phonebook data, for example, each name and an associated phone number, to remove any duplicate entries where the text and/or phone numbers are identical to other entries in the phonebook data. For example, an entry may match another entry when the case insensitive text of the name field in two entries is identical, for example, "JOE SMITH" matches "Joe Smith" which also matches "joe smith."

At a step 176, the phonebook entries are sorted alphanumerically and consolidated so that all entries of the same person (i.e., where the text of the entries is identical but the phone numbers are different) are in a single entry.

At a step 178, in-vehicle control system 106 may use a predefined set of rules to determine a number's location identifier (e.g., home, work, mobile, pager) in the text of an entry that may be associated with one or more phone numbers in the entry. For example, a character sequence embedded in the text of an entry may be interpreted as a location identifier when the sequence consists of a special character (e.g., @, /, \) followed by one or more alphabetic characters.

At a step 180, a phonemic representation is generated for the name string (i.e., the text of the entry excluding location identifiers) or the name string and location identifier of each entry using text-to-grammar device 138. The phonemic representation is a phonemic representation that may be used by the speech recognition device 136 to recognize a user's utterance and, therefore, allow speech recognition to be performed against the entry of the mobile phonebook. In one exemplary embodiment, a phonemic representation is generated for the name string of each phonebook entry. In another exemplary embodiment, location identifiers may be included with the name string in the text of the entry used to generate a phonemic representation in order to create and recognize a more descriptive command (e.g., "call John Smith at work").

At a step 182, the phonemic representation are stored in memory 132 as a phonemic representation list that is associated with the mobile phonebook. Accordingly, speech recognition may be performed against the mobile phonebook entries and a user may use the mobile phonebook for hands-free dialing of a hands-free telephone system portion of the in-vehicle control system 106. Once the mobile phonebook including an associated phonemic representation is created, the mobile phonebook entries are available to a user for speech-enabled browsing and calling (or dialing). In-vehicle control system 106 may also configured to allow a user to transfer and store mobile phonebook entries to the system phonebook.

Figure 7:
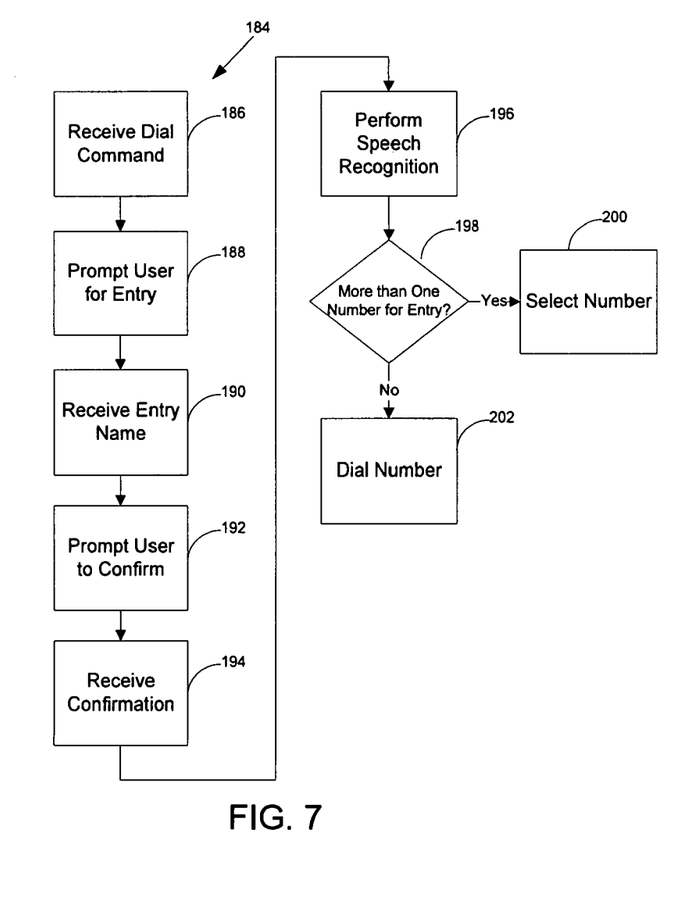
FIG. 7 is a process flow diagram illustrating a method of receiving a request from a user to access a phonebook entry including an associated phonemic representation using speech recognition with the in-vehicle control system of FIG. 3 according to one exemplary embodiment.

Referring to FIG. 7, a method 184 for speech-enabled dialing using a mobile phonebook is illustrated according to one exemplary embodiment. In-vehicle control system 106 will automatically dial a number on a hands-free phone set using speech recognition of user commands.

At step 186, in-vehicle control system 106 receives a command to initiate a phone call from a user via audio input device 128.

At a step 188, in-vehicle control system 106 prompts the user to provide an entry name. The prompt may be played via audio output device 130 or the sound system.

At a step 190, the user may provide the entry name with an oral command to initiate a call (e.g., "call <entry name>").

At a step 192, in-vehicle control system 106 prompts the user to confirm the entry provided at step 190.

At a step 194, in-vehicle control system 106 may receive oral confirmation or confirmation via user interface 126 (e.g., a button or switch) from the user that the correct entry was provided.

At a step 196, if confirmation was received at step 194, speech recognition device 136 compares the command with the mobile phonebook entries and system phonebook entries and identifies the desired mobile phonebook entry. If there are similar entries in the system phonebook and the mobile phonebook, the speech recognition device may select the best match.

At a step 198, the speech recognition device determines if there is more than one number associate with the desired entry (e.g., the entry includes a home number and a work number). In the event that there is more than one number associated with the entry, in-vehicle control system 106 may list the numbers in the entry via an audible prompt on audio output device 130 or via a visual prompt on output display 108. In an exemplary embodiment where an audible prompt is given, text-to-speech device 138 may be used to convert the numbers to audio output.

At a step 200, the user may then select the appropriate number via an oral command or user interface 126 (e.g., a button or switch).

At a step 202, once a number has been determined, in-vehicle control system 106 sends the phone number to mobile phone 144 via communications link 118 and the number is dialed.

Figure 8:
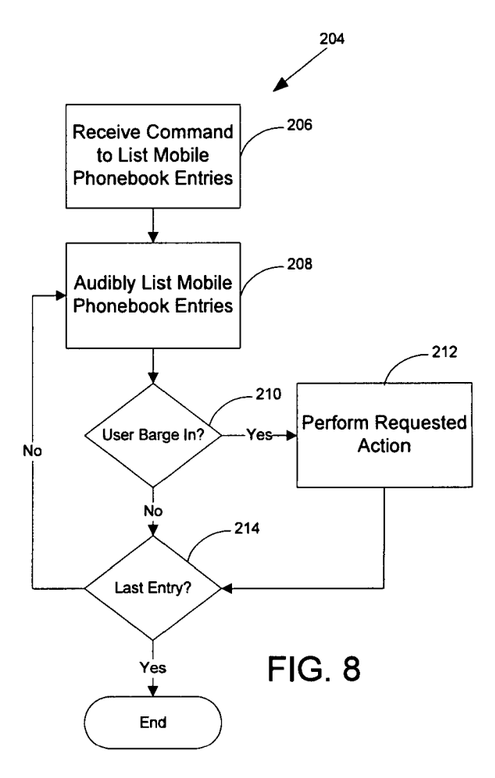
FIG. 8 is a process flow diagram illustrating a method of listing phonebook entries to a user with the in-vehicle control system of FIG. 3 according to one exemplary embodiment.

Referring to FIG. 8, in-vehicle control system 106 is also configured to provide a user with a listing of the mobile phonebook entries upon request. A method 204 for audibly listing phone entries of a mobile phonebook in accordance with one exemplary embodiment is illustrated.

At a step 206, in-vehicle control system 106 receives an oral command from the user via an audio input device 128 to list the contents of the mobile phonebook.

At a step 208, in response to the oral command, in-vehicle control system 106 plays the text of each entry. The text (e.g., name text) of each entry is converted to an audio representation using text-to-speech device 138 and the audio may be played in the vehicle over audio output device 130 or the sound system. Preferably, the text of the entries is also shown on output display 108 in alphanumeric order sorted character by character. A predetermined time period elapses between the playing of each entry and in-vehicle control system 106.

At a step 210, in-vehicle control system 106 is be configured to allow the user to interrupt the audible listing of the phonebook entries by permitting the user to "barge-in." A user may barge in during the playing of an entry text or during a predetermined time after the playing of the entry in order to execute a command given orally to audio input device 128 or via user interface 126 (e.g., a button or switch).

At a step 212, if the user provides a command and "barges in," in-vehicle control system 106 recognizes and performs the requested action. For example, a user may provide a command to skip to the next entry or to skip to an entry beginning at the next alphanumeric character. A user may also provide commands to select a desired entry once it is heard or to repeat a previous entry. If an entry is selected, a user may then, for example, initiate a call or transfer the entry to the system phonebook.

At a step 214, in-vehicle control system 106 determines whether the last entry has been reached or if an entry has been selected. If the last entry has been reached or if an entry has been selected, in-vehicle control system 106 ends method 204. If the last entry has not been reached, method 204 returns to step 208 and continues until either an entry is selected or the last entry in the mobile phonebook is reached.

Figure 9:
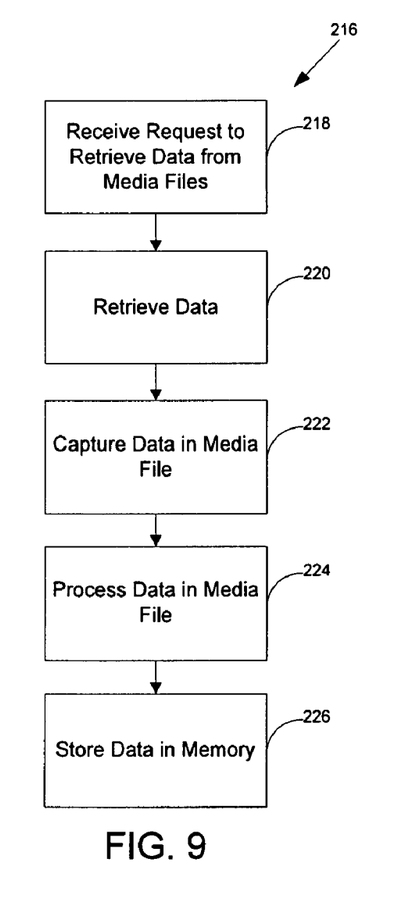
FIG. 9 is a process flow diagram illustrating a method of retrieving and processing data from media files within a media player with the in-vehicle control system of FIG. 3 according to one exemplary embodiment.

Referring to FIG. 9, a method 216 for retrieving media file data from remote source 116 in response to a user command is illustrated in accordance with one exemplary embodiment. It is noted that in the exemplary embodiment of method 216, remote source 116 may be media player 148, mobile phone 144, personal data assistant 146, pager 152, personal navigation device 150, remote server 154, or any other device capable of storing media data.

At a step 218, in-vehicle control system 106 receives a request to retrieve media file data from remote source 116. After wireless communications link 118 is established between in-vehicle control system 106 and remote source

116, a user may provide a command to retrieve media file data from remote source 116. As mentioned, a user may provide a request via user interface 126, for example, using a button or switch. Alternatively, the user may provide an oral command to request retrieval of the data.

At a step 220, in-vehicle control system 106 sends a request to remote source 116 via wireless communications link 118 and retrieves the media data from remote source 116.

At a step 222, once the media file data are transferred to in-vehicle control system 106, the data are captured in a file for local storage.

At a step 224, the retrieved media files are then processed before being stored in memory 132. Processing of the media files may include conversion to a suitable file format, data compressions or decompression, or any other suitable functions.

At a step 226 and after processing, the media files are stored in memory 132. The media file data may be stored in volatile memory 140 and accordingly, the media file data are not preserved across power cycles of in-vehicle control system 106. Preferably, the media file data may be stored in non-volatile memory 142 and may be maintained across power cycles and available to a user after power-on initialization. When communications link 118 is established with a different remote source 116 (e.g., of another vehicle occupant), the data in volatile memory 140 may be overwritten with the media file data from the new media player.

Figure 10:
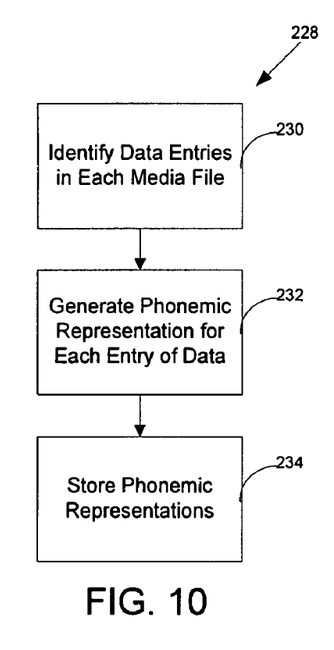
FIG. 10 is a process flow diagram illustrating a method of generating a phonemic representation of data associated with data entries in a media file with the in-vehicle control system of FIG. 3 according to one exemplary embodiment.

Referring to FIG. 10, a method 228 for processing media file data from remote source 116 is illustrated. At a step 230, in-vehicle control system 106 accesses the media files and identifies the individual entries of the data such as song title, album title, artist, genre, time length, track number, the elapsed time, recording label, featured artist, or other related data.

At a step 232, a phonemic representation may be generated for the text data of each entry of a media file using text-to-grammar device 134. The phonemic representation is a phonemic representation that may be used by speech recognition device 136 to recognize a user's utterance and, therefore, allow speech recognition to be performed against each entry of a media file.

At step 234, the phonemic representations are stored in memory 132 as a phonemic representation list that is associated with the media files. Accordingly, speech recognition may be performed against the text data of a media file. Once the media file data are stored in memory 132, the media files may be available to a user for speech-enabled manipulation of a media file.

Figure 11:
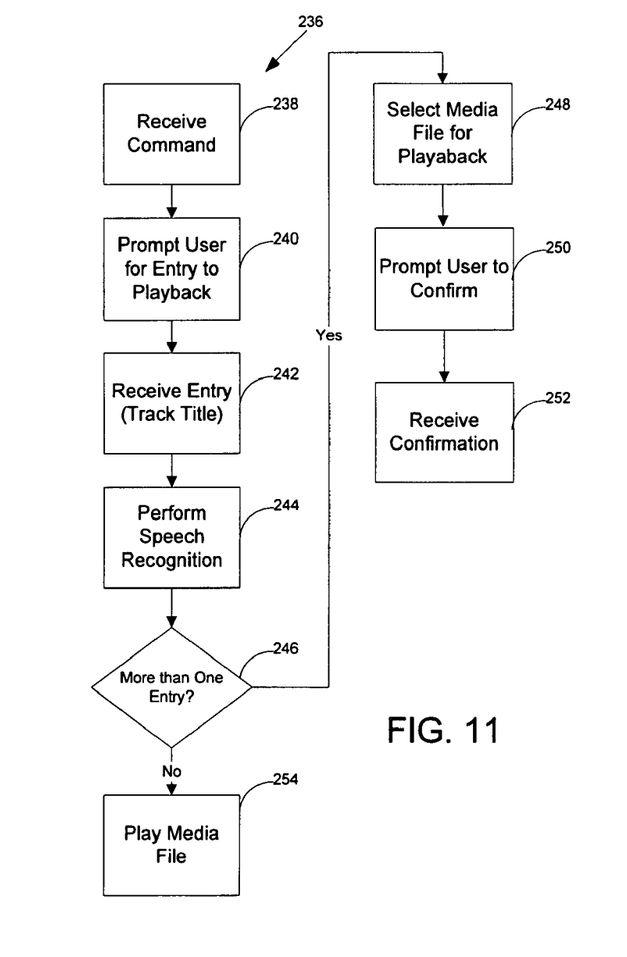
FIG. 11 is a process flow diagram illustrating a method of receiving a request from a user to play a media file using speech recognition with the in-vehicle control system of FIG. 3 according to one exemplary embodiment.

Referring to FIG. 11, as mentioned, a user may manipulate (e.g., play, pause, stop, next, previous, fast-forward, rewind, etc.) a media file using an entry of the media file data stored in memory 132. A method 236 for speech-enabled playback using memory 132 is illustrated according to an exemplary embodiment.

At a step 238, in-vehicle control system 106 receives a command to initiate playback of a media file from a user via audio input device 128 or user interface 126.

At a step 240, in-vehicle control system 106 prompts the user to indicate which media file to playback. The prompt may be played via audio output device 130 or the sound system.

At a step 242, the user may provide (i.e., utter) the entry name with an oral command to play a song (e.g., "play <track title>").

At a step 244 and after the system receives the track title of the desired media file at step 242, the system identifies the desired entry.

At a step 246, speech recognition device 136 determines if there is more than one entry associated with a phonemic representation. For example, if the user commands the system to "play The White Album," the system may be configured to recognize that more than one media file is associated with that album title. If there is more than one entry, in-vehicle control system 106 may be configured to list (via an audible prompt or via output display 108) the associated media files (e.g., songs or tracks) for that album name. Alternatively, in-vehicle control system 106 may be configured to just begin playback of the media files (i.e., tracks) of the album from the beginning of album or from a pre-selected track number.

At a step 248, the user may select a desired media file by providing an oral command to audio input device 128 or via user interface 126.

At a step 250, once a media file has been selected, in-vehicle control system 106 prompts the user via audio output device 130 and/or output display 108 to confirm the track title of the media file.

At a step 252, in-vehicle control system 106 receives confirmation of the track title via audio input device 128 or user interface 126.

At a step 254 and after confirmation is received at step 252, in-vehicle control system 106 begins playback of the media file. Alternatively, the system nay be configured to determine that there is more than one album with a particular phrase in the album title (e.g., "Greatest Hits"). In this case, in-vehicle control system 106 is configured to recognize that more than one album title includes the uttered phrase, based on a confidence scoring algorithm. Speech recognition device 136 may provide the best matches, and the user may then be prompted to select the desired album from among the matches.

Figure 12:
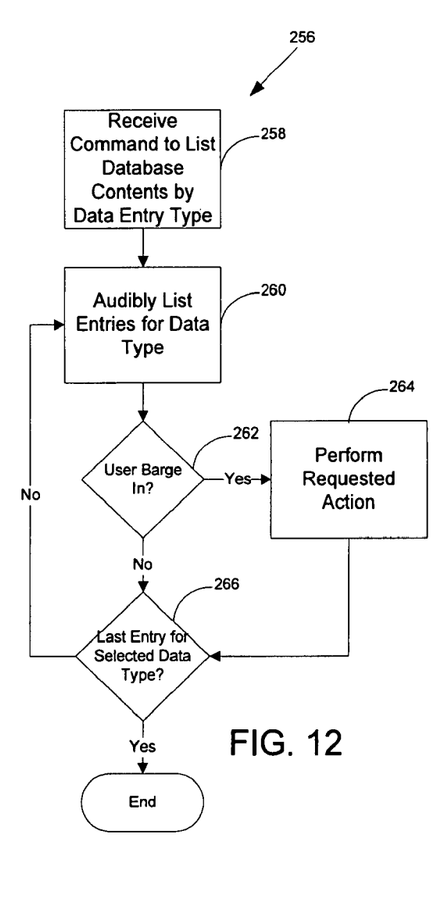
FIG. 12 is a process flow diagram illustrating a method of listing media file entries to a user with the in-vehicle control system of FIG. 3 according to one exemplary embodiment.

Referring to FIG. 12, in-vehicle control system 106 is also configured to provide a user with a listing of the data of the available media files upon request (e.g., "list albums,". "list artists," etc.). A method 256 for audibly listing data of media files is illustrated according to one exemplary embodiment.

At a step 258, in-vehicle control system 106 receives an oral command from the user via an audio input device 128 to list the media file contents of memory 132 by data entry type.

At a step 260 and in response to the command, in-vehicle control system 106 audibly list the data entries of each media file. For example, if the user's command is "list albums," each album title would be listed. The text (e.g., album title) of each media file is converted to an audio representation using text-to-speech device 138 and the audio may be played in the vehicle using speakers 126 or the sound system. Preferably, the text of the entries is also displayed in alphanumeric order sorted by character on output display 108. A predetermined time period elapses between the playing of each entry.

At a step 262, in-vehicle control system 106 is configured to allow the user to interrupt the audible listing of the selected data by permitting the user to "barge-in." A user may barge in during the playing of an entry text or during a predetermined time after the playing of the entry in order to execute a command.

At a step 264, if the user provided a command (i.e., barges in) at step 262, in-vehicle control system 106 recognizes and performs the requested action. For example, a user may provide a command to skip to the next entry in the list of selected media data or to skip to the entry beginning at the next alphanumeric character. A user may also provide commands to select a desired media file once it is heard or to repeat a previous entry. If a media file is selected, a user may then initiate an action (e.g., playback of a media file).

At step 266, in-vehicle control system 106 determines whether the last media file has been reached or whether a file has been selected. If the last media file has been reached or a file has been selected, method 56 ends. If the last entry has not been reached or no file has been selected, the process returns to step 260 and continues listing data entries until either an entry is selected or the last entry in memory 132 is reached.

It is noted that while the invention is described with reference to specific embodiments, drawings, and description, other uses of in-vehicle control system 106 exist and have been considered. For example, in one embodiment, an expanded use of in-vehicle control system 106 could be vehicle data logging. In-vehicle control system 106 may be connected to the vehicle bus and thus have access to the vehicle odometer and other vehicle functions and data. In-vehicle control system 106 may also have a manual input method to track certain vehicle data.

In one example, a user may track miles per gallon history by inputting the number of gallons and cost. In-vehicle control system 106 may log odometer readings, dates, and compute average miles per gallon (MPG) by tank. Average MPG computations may be added to an ongoing history, while in-vehicle control system 106 may provide a histogram or other visual graphic on output display 108, store data in memory 132, output data to remote source 116 on command, or flag the user when there appears to be a problem related to mileage patterns.

In another exemplary embodiment, during vehicle servicing, in-vehicle control system 106 may log service events while providing text or graphical output to a remote source 116 or to output display 108. For example, when the oil of the vehicle is changed, in-vehicle control system 106 may track the event, and warn the user when it is time to change it again. Similar events and reminders could be set up regarding tire changing and rotation, filter changing or inspection, and/or emissions testing. Speech recognition system 136 may be used to creating a more natural input system in each of these exemplary embodiments.

In still another exemplary embodiment, in-vehicle control system 106 may provide audio (via audio output device 130) and/or visual (via output display 108) entertainment, for example an audio and/or video game or informative display, regarding vehicle data on the vehicle bus. Such vehicle data may include information related to a distance traveled, a global positioning system (GPS) with GPS coordinates, external or internal vehicle cabin temperature, information on a distance to empty (DTE) fuel tank, or any combination thereof. By using data from the vehicle bus, software or hardware updates are not needed to provide current information. One example embodiment could relate to a guessing game or informative display that may answer questions such as "How long [in time] until we get there?" or "How far [in distance] until we get there?"

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate vehicle system, incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the diagrams herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software implementations of the present invention could be accomplished with standard programming techniques with rule based logic and other logic to accomplish the various connection steps, processing steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A control system for use in a vehicle and for accessing data files from a portable electronic device over a wireless communication link, the vehicle including a microphone for receiving an oral command from a vehicle occupant and an output display, the system comprising:

a communication device for establishing the wireless communication link with the portable electronic device, the communication device being configured to receive a plurality of data files from the portable electronic device, wherein each of the data files includes text data;

a data processing device coupled to the communication device, the data processing device being configured to generate a phonemic representation of the text data of the data files, wherein the phonemic representation of the text data of each data file is configured to facilitate speech recognition relating to the files;

a speech recognition device configured to receive the oral command from the microphone, the speech recognition device being further configured to compare the received oral command to the phonemic representation of the data file generated by the data processing device; and a display driver for coupling to the output display, the display driver being configured to provide an electronic signal to the output display, wherein the electronic signal comprises a representation of the text data.

2. A control system according to claim 1, further including a user interface configured to receive input commands from a user to facilitate accessing and manipulating the data files accessed from the portable electronic device.

3. A control system according to claim 2, wherein the user interface comprises a tactile user interface.

4. A control system according to claim 1, further including a data conversion device configured to convert the text data of each data file into an audible speech representation of the text data.

5. A control system according to claim 1, wherein the portable electronic device comprises any of the following: a media player, a mobile phone, a personal digital assistant, a personal navigation device, and a pager.

6. A control system according to claim 1, further including a memory device configured to store the data files and the phonemic representation of the text data of the data files accessed from the portable electronic device.

7. A control system according to claim 6, wherein the memory device comprises a volatile memory.

8. A control system according to claim 6, wherein the memory device comprises a non-volatile memory.

9. A control system according to claim 6, wherein the control system is configured to sort the plurality of data files received from the remote source, such that the system stores and consolidates in the plurality of data files in the memory device.

10. A control system according to claim 9, wherein the control system is configured to identify and remove duplicate data files in the memory device.

11. A method for recognizing speech received from a vehicle occupant at a microphone mounted in a vehicle using a control system for mounting in the vehicle, the speech relating to a data file stored in a portable electronic device, the method comprising:

establishing a wireless communication link between the control system and the portable electronic device;

retrieving the data file from the portable electronic device over the wireless communication link, the data file including text data;

identifying the text data;

generating a phonemic representation of the text data;

comparing the generated phonemic representation to a signal received from the microphone at the control system, the signal representing the speech; and causing the portable electronic device to establish a phone call based on a result of the comparison.

12. A method according to claim 11, further including storing the phonemic representation of the text data of the data files in a memory device.

13. A method according to claim 11, further including the step of converting the text data of each data file into an audible speech representation of the text data.

14. A method according to claim 11, wherein the portable electronic device comprises any of the following: a media player, a mobile phone, a personal digital assistant, and a pager.

15. A method according to claim 11, wherein the data file is retrieved in response to establishing the wireless communication link between the control system and the portable electronic device.

16. A method according to claim 11, wherein the data file is retrieved in response to a command by a user.

* * * * *